United States Patent Office 3,525,256
Patented Aug. 25, 1970

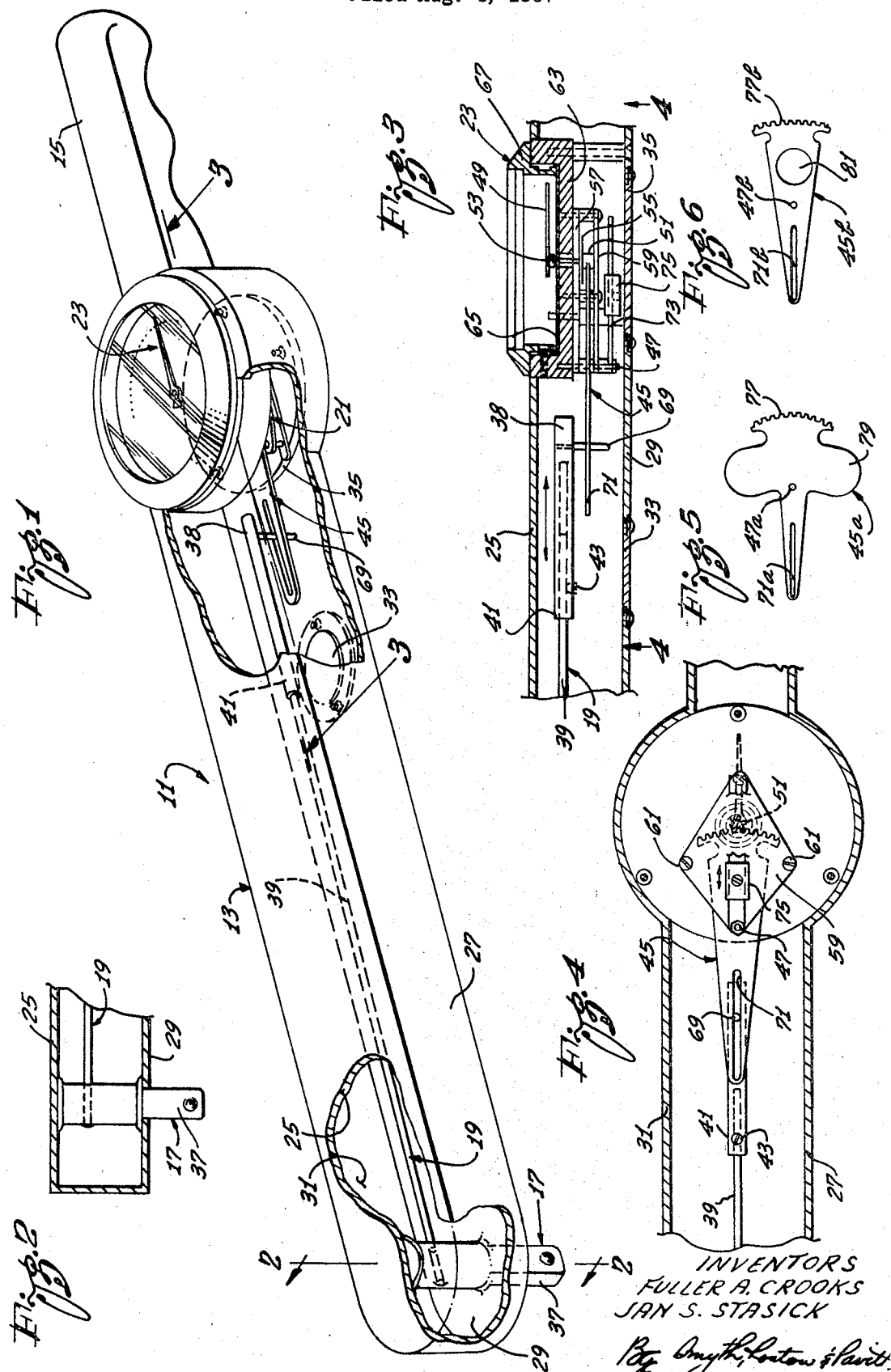

3,525,256
TORQUE WRENCH
Fuller A. Crooks, Manhattan Beach, and Jan S. Stasiek, Altadena, Calif., assignors, by mesne assignments, to Torque Controls, Inc., El Monte, Calif., a corporation of California
Filed Aug. 4, 1967, Ser. No. 658,538
Int. Cl. G01l *5/24*
U.S. Cl. 73—139            12 Claims

ABSTRACT OF THE DISCLOSURE

A torque wrench including a generally tubular bendable member and a nonbendable member. When the torque wrench is used to apply a torsional force to a threaded fastener, the bendable member deflects relative to the nonbendable member. Means are provided to measure the relative movement between the two members to thereby provide a visual indication of the force being applied to the fastener. The wrench is equipped with means which allow the wrench to be zeroed in one position and subsequently used in a second position without introducing error in the dial reading.

BACKGROUND OF THE PRESENT INVENTION

In a typical indicating torque wrench the force or moment being applied thereby to a nut or other threaded member or fastener is readable directly on an indicator dial on the wrench. Thus, the workman can tighten the fastener the appropriate amount without danger of stripping the threads.

Prior art indicating torque wrenches generally fall into two classes, namely, the bending beam type and the torsion bar type. Generally, the beam type includes two members, one of which is bendable in response to the application of a torsional force to the fastener and the other of which is substantialy nonbendable during this time. Therefore, as the wrench applies a force to the fastener, relative movement between the two members occurs. A suitable device on the wrench measures the relative movement and in response thereto, provides a visual dial reading for the operator which indicates the magnitude of the force applied.

In some torque wrenches of the beam-type, the nonbendable member is exposed, and is subject to being damaged when the wrench is being used or when the wrench is dropped. Any bending of, or damage to, the nonbendable member adversely effects the accuracy of the wrench and may make the same totally unsuited for its intended purposes. In some instances, the nonbendable member takes the form of a housing and a bendable member is encased therein. This latter type of wrench is heavy, relatively bulky, and expensive. The additional weight is caused primarily by the fact that the housing must be nonbendable and therefore must be constructed of heavy strong steel and similarly, the bendable member within the housing must also be relatively large to withstand the applied torque.

When a beam is held at one end and a force is applied to the free end thereof, the beam deflects. This deflection may be measured or considered as linear or angular deflection. Angular deflection of the beam is represented by the arc or curve that is assumed by the beam when the beam deflects. More particularly, angular deflection is the angle between the tangents to the free and fixed ends of the beam. Linear deflection may be considered as the displacement, which is substantially linear, that the free end of the beam undergoes.

At least some prior art torque wrenches of the beam-type utilize a bendable member and a nonbendable member which moves in response to the angular deflection of the bendable member. The nonbendable member is affixed to the end of the bendable member remote from the head so that when the beam deflects, the nonbendable member moves or pivots with the beam in response to the angular deflection of the beam.

One problem with this construction is that the beam also undergoes some linear deflection and the nonbendable member also moves somewhat in response thereto. Thus, the nonbendable member is not isolated from the bending of the beam and, accordingly, the movement of the nonbendable member is dependent upon a compound effect, i.e., linear and angular deflection, and is, therefore, more likely to produce error. Furthermore, with this compound movement of the nonbendable member, the movement of the nonbendable member in response to the linear deflection of the beam tends to offset the movement of the nonbendable member in response to the angular deflection of the beam. Thus, the net movement of the nonbendable member relative to a fixed point is relatively small and, accordingly, such relative movement must be multiplied many times in order to provide a suitable dial reading. Such multiplication of the movement also multiplies any error that may be in the device and therefore this type of wrench is much less accurate than is desirable.

Typically, a torsion type torque wrench includes an elongated housing having a torsion element projecting laterally thereof and affixed thereto. The torsion element is engageable with the work to impart a torsional force thereto and the amount of torsional deflection which the torsion member undergoes is transmitted by an elongated rod to an indicator mounted on the housing. The relative movement between the elongated arm and the housing can be converted into a dial reading indicating the magnitude of the torsional force being applied.

A primary problem with this latter type of torque wrench is that if the wrench is to have adequate capacity for many applications, the torsion member must be quite long and this necessitates increasing the size of the housing. The increased size of the torsion member and the housing add to the weight of the wrench and in addition makes use thereof in relatively cramped working areas difficult or impossible. Further, in some prior art torque wrenches, special exotic steels must be utilized and this represents a substantial increase in cost of the wrench.

As can be seen both types of prior art torque wrenches measure the applied torque by comparing the amount of deflection of a bendable member and a nonbendable member. In wrenches of both the beam and torsion type, it is common practice to utilize an elongated arm for one of the members or for transmitting the movement of the bendable member. The elongated arm is connected to the means for converting the relative movement between the members into a dial reading.

The relatively long unsupported length of the arm or member is subject to deflecting in certain spatial positions of the wrench, and this causes an error in the dial reading. In the typical instance, a workman may "zero" the wrench in a first position and then use the wrench in one or more operative positions. As the elongated member is deflectible, any change of position of the wrench following the zeroing thereof will cause the deflection to occur in a different direction which in turn will adversely influence the dial reading.

SUMMARY OF THE INVENTION

The present invention teaches that numerous advantages are obtainable by using a torque wrench housing as a bendable beam and encasing the nonbendable member therein. The housing is preferably generally tubular and therefore is lightweight, but nevertheless supplies the torque wrench with substantial capacity as the thin walled tubular cross section offers substantial resistance to bending about a transverse axis. This arrangement requires significantly less metal and therefore is less expensive, lighter weight, and less bulky than prior art torque wrenches of corresponding capacity. By way of example, a torque wrench constructed in accordance with the teachings of this invention may be about one half as heavy as a prior art torque wrench of corresponding capacity. As the nonbendable member is encased within the housing, there is no danger of bending or damaging such member. Preferably, the housing forms a dust-tight enclosure to prevent contamination of the inner parts of the wrench.

The length, cross sectional configuration, and wall thickness of the housing can all be varied depending upon the desired capacity of the wrench. No exotic metals are required for the housing and the housing may be constructed of mild steel.

The torque wrench of this invention also preferably includes a head secured to the housing preferably adjacent an end thereof. To assure that the head will be rigidly secured to the housing, it is preferred that the head extend through one wall of the housing to the opposed wall thereof and that the head be welded or otherwise rigidly attached to a housing at both walls. The head is engageable with the work to apply a torsional or twisting force thereto.

The housing preferably has a handle adjacent the end of the housing remote from the head. A dial is preferably located closely adjacent the handle to facilitate reading thereof.

The wrench includes a nonbendable member which is preferably in the form of an elongated actuating arm extending longitudinally within the housing. One feature of this invention is that the actuating arm or other type of nonbendable member is held stationary when the housing is undergoing bending in response to the application of a torque to a fastener. Stated differently, the actuating arm is isolated from both linear and angular deflection of the housing so that the actuating arm undergoes no movement in response to the bending of the housing. Thus, with the present invention the housing moves and the actuating arm remains stationary and the relative movement therebetween is measured and converted into an appropriate dial reading.

The actuating arm can be isolated from the bending of the housing by fixing one end of the actuating arm to a portion of the housing which does not undergo bending. For example, the actuating arm may be affixed to the head or to the housing closely adjacent to the head as these areas of the housing do not undergo movement in response to bending of the housing. By affixing the actuating arm directly to the head there is no need for a separate connector for connecting the actuating arm to the housing.

The actuating arm preferably extends longitudinally through the housing and terminates in a free end which preferably lies closely adjacent the dial and the handle. The relative movement between the free end of the actuating arm and the housing is measured and converted to a dial reading. More particularly, the linear deflection of the housing relative to the free end of the actuating arm is measured. The angular deflection is not measured and does not influence the dial reading. In order that the amount of measured deflection of the housing may be as large as possible it is preferred that the actuating arm be as long as possible.

A gear is mounted for pivotal movement within the housing adjacent the free end of the actuating arm and is drivingly connected thereto. When the torque wrench is utilized to apply torque to a fastener, the housing deflects; however, the actuating arm is at least substantially isolated from the deflection and accordingly, the free end thereof does not move. As the gear is connected to both the housing and the actuating arm, it pivots in response to relative movement between the actuating arm and housing. A suitable mechanism is responsive to the pivotal movement of the housing to provide a dial reading for the operator. The length of the actuating arm is preferably adjustable to calibrate the indicator.

The present invention also teaches elimination of the problem heretofore caused by the deflection of one of the elongated members of the torque wrench under the influence of its own weight. More specifically, the present invention teaches that this problem can be eliminated by counterbalancing one of the pivotally mounted members of the movement utilized to convert the relative movement between the bendable and nonbendable members into a dial reading. By way of example, the counterbalancing may be accomplished by adding a weight to the gear on the opposite side of the pivotal axis from the connection between such gear and the actuating arm. Thus, when the torque wrench is turned so that the actuating arm tends to deflect and apply a force to the gear tending to pivot the same, the weight on the gear exerts an equal and opposite moment on the gear to prevent rotation thereof.

Because of allowable tolerances for the actuating arm and the gear, it may be necessary to utilize different counterbalancing moments for different torque wrenches of the same style and capacity. Accordingly, the present invention teaches the use of a weight which is movable to various distances from the pivotal axis of the gear so that the exact counterbalancing moment may be selected for each wrench. In one preferred form, the gear is fixed to a pivotable pin. An elongated arm is also affixed to the pin and carries a weight movable therealong to adjust the counterbalancing moment.

The invention, both as to its organization and method of operation together with further features and advantages thereof may best be understood by reference to the following description taken in connection with the accompanying illustrative drawings.

BRIEF DESCRIPTION OF THE DRAWINGS

FIG. 1 is a perspective view of a torque wrench with portions thereof broken away to expose the interior of the device.

FIG. 2 is a sectional view taken along line 2—2 of FIG. 1 and showing how the head is secured to the body.

FIG. 3 is a fragmentary side elevational view of the movement for providing a dial reading and the adjacent portions of the wrench.

FIG. 4 is a bottom plan view of the movement with the surrounding portion of the housing being shown in section.

FIG. 5 is a top plan view of a modified form of sector gear.

FIG. 6 is a top plan view of still another form of sector gear.

DESCRIPTION OF THE PREFERRED EMBODIMENTS

Referring to the drawings and in particular to FIG. 1 thereof, reference numeral 11 designates a torque wrench constructed in accordance with the teachings of this invention. Generally, the torque wrench 11 includes a generally hollow or tubular housing 13 which defines a bendable beam and which has a handle 15 and a head 17 suitably provided at the opposite ends thereof. A nonbendable member or main actuating arm 19 is mounted within the housing and drivingly connected to a movement 21 which operates an indicator 23. The movement 21 converts relative movement between the housing 13 and the main actuating arm 19 to a dial reading on the indicator 23.

More particularly, the housing 13 is an elongated tubular or hollow member perferably constructed of a strong inexpensive metal such as mild steel and for a substantially dust-tight enclosure for the other component of the device. In the embodiment illustrated the housing 13 is generally rectangular in transverse cross section and includes four walls 25, 27, 29, and 31. The cross sectional shape of the housing 13, the thickness of the walls thereof, and the length of the housing 13 may all be suitably varied depending upon the desired capacity of the torque wrench 11. Similarly, the housing 13 may be oriented relative to the head 17 to assist in achieving the desired rated capacity of the wrench. The wall 29 of the housing is preferably provided with two access panels 33 and 35 to provide access to specified locations within the interior of the housing 13.

The handle 15 may be a separate member affixed to the housing 13 or may be an integral continuation thereof. The head 17 is preferably affixed to the housing 13 adjacent the opposite end of the housing so that a maximum length thereof will be subjected to forces tending to bend the housing. As best seen in FIG. 2, the head 17 passes through the wall 29 and into contact with the interior surface of the wall 25. The head 17 is preferably rigidly affixed to both of the walls 25 and 29 as by welding to provide maximum support therefor. The head 17 has an exterior portion 37 which is engageable with the work such as a suitable socket to apply a torsional force to a threaded fastener (not shown).

The main actuating arm 19 remains stationary when the housing 13 bends and thus, the actuating arm 19 is isolated from bending of the housing. In the embodiment illustrated this is accomplished by rigidly affixing one end of the actuating arm 19 to the head 17 which does not move in response to bending of the housing 13, as shown in FIG. 2. The actuating arm 19 may pass through the interior portion of the head 17 and be welded therein. Although the arm 19 could be rigidly affixed to the housing closely adjacent the head 17 in many different ways, use of the head 17 for this purpose is preferred to reduce the number of parts required. The actuating arm 19 extends longitudinally through the housing 13 and terminates in a free end 38 adjacent the indicator 23. The actuating arm 19 is preferably of variable length to allow calibration of the torque wrench. Although various types of variable length arms may be utilized, the arm 19 in the embodiment illustrated is in the form of two telescoping sleeves 39 and 41. As shown in FIGS. 3 and 4, the sleeves 39 and 41 may be held together by a set screw 43, access to which is provided by the panel 33. Use of the sleeves 39 and 41, in addition to providing a variable length arm, serve to keep the weight of the torque wrench at a minimum.

When the torque wrench 11 is used to apply a torsional force to a fastener, the housing 13 deflects or bends about a transversely extending axis while the head 17 remains stationary. As the arm 19 is rigidly affixed to the head 17, the arm 19 is held stationary. This causes a movement of the housing 13 relative to the free end 38 of the arm 19. The movement 21 converts such relative movement into a dial reading readable on the indicator 23.

For this purpose, the movement 21 includes a sector gear 45 (FIGS. 1, 3 and 4) affixed to a pin 47 for pivotal movement therewith. The sector gear 45 drives a pointer 49 through a pinion 51 and a shaft 53. The pointer 49 is biased toward a zero reading by a suitable spring 55 connected to the pinion 51 to drive the latter. The movement 21 may be mounted in any suitable manner as between two parallel plates 57 and 59 which are held together by several fasteners 61. The plates 57 and 59 are preferably affixed to a cup-like member 63 of the indicator 23 to provide a space between the wall 29 of the housing 13 and the plate 59. As shown in FIG. 3, the cup-like member 63 extends through an opening in the wall 25 into the interior of the housing and has a dial 65 mounted therein. The indicator 23 also includes a closure member 67, at least a portion of which is transparent, for closing the open upper end of the cup-like member 63 to provide a dust-tight enclosure for the dial 65 and the pointer 49.

The free end 38 of the arm 19 may be connected in various manners to the sector gear 45. In the embodiment illustrated this is accomplished by a pin 69 affixed to the arm 19 and engaging in a slot 71 in the sector gear 45. The slot 71 allows the sector gear 45 to pivot about the axis of the pin 47 and also permits length adjustment of the arm 19.

In operation of the wrench 11, the head 17 is drivingly connected to a fastener or other member and when such member offers substantial resistance to the torsional force applied by the wrench 11, the housing 13 deflects while the arm 19 is held stationary by the head 17. As the movement 21 is secured to the housing 13 by the fasteners 61, the linear deflection of the housing is transmitted to the gear 45 through the pin 47. However, the gear 45 is connected by means of the pin 69 to the stationary arm 19. This imparts pivotal movement to the sector gear 45 which in turn drives the pointer 49 through the pinion 55 and the shaft 53. The bending of the housing 13 is, of course, correlated to the torsional force applied to the fastener by the head 17, so that the pointer 49 indicates the force or moment applied thereto.

Thus, the relative movement between the free end of the arm 19 and the portion of the housing 13 is converted to a dial reading. Only the linear displacement or deflection of the housing 13 relative to the free end 38 is measured and the angular deflection of the housing 13 is not measured.

As shown in FIG. 3 a relatively long length of the arm 19 is held in cantilever fashion by the head 17. Assuming that the operator zeroed the wrench 11 in the position thereof shown in FIG. 1 and then rotated the wrench about its longitudinal axis through 90° from the position shown in FIG. 1, the arm 19 would deflect slightly under its own weight thereby driving the sector gear 45 and causing the pointer 23 to move from the zero position, prior to the time that any force had been applied to the fastener by the wrench 11. With the present invention, such deflection is minimized by utilizing a hollow lightweight arm 19. Further, the present invention teaches eliminating of this error-introducing factor by counterbalancing the sector gear 45 to offset the moment applied thereto by the deflection of the arm 19 under its own weight.

In the preferred embodiment, this counterbalancing is accomplished by attaching an arm 73 to the pin 47 and providing a weight 75 slidably mounted on the arm. The arm 73 projects outwardly from the pin 47 on the opposite side thereof from the arm 19. The weight 75 may be affixed at the desired position along the length of the arm 73 as by a setscrew (not shown). It can be seen therefore that the arm 73 and the weight 75 will exert an oppositely directed moment on the pin 47 to thereby serve to counterbalance the sector gear 45.

Because of the allowable manufacturing tolerances of the various parts of the wrench 11 including the arm 19 and the sector gear 45, it has been found that slightly different counterbalancing moments may be required to accommodate individual wrenches of the same design. According to the present invention, the counterbalancing force or moment can be adjusted accordingly to accommodate the variance introduced by the allowable tolerances of the wrench. In the embodiment shown in FIG. 3, this is accomplished by moving the weight 75 to the position along the arm 73 which provides the correct counterbalancing moment. Access to the weight 75 is provided by the access panel 35.

FIG. 5 illustrates a modified form of sector gear 45a which can be substituted for the sector gear 45, the arm 73, and the weight 75. The sector gear 45a is pivotally mounted on a pin 47a and contains an elongated slot 71a for receiving the pin 69. The sector gear 45a has teeth 77 for drivingly engaging the pinion 51. In the embodiment of FIG. 5, the sector gear 45a is formed integrally with an enlarged section 79 which serves as the counterbalancing force. Thus in the embodiment of FIG. 5 the arm 73 and the weight 75 have been eliminated and counterbalancing is achieved by appropriate shaping of the sector gear 45a. Of course, this embodiment does not have the variable counterbalancing feature which is obtainable with the movable weight 75. (Note that the pin 47a need not be fixed to the sector gear for pivotal movement therewith.)

FIG. 6 shows still another form of sector gear 45b. The sector gear 45b is rotatably mounted on a pin 47b and has a slot 71b and teeth 77b for the purpose described hereinabove. In this embodiment counterbalancing is achieved by adding a fixed weight 81 to the sector gear 45b intermediate the pin 47b and the teeth 77b.

Although exemplary embodiments of the invention have been shown and described, many changes, modifications, and substitutions may be made by one having ordinary skill in the art without necessarily departing from the spirit and scope of this invention.

What is claimed is:

1. In a torque wrench including first and second relatively movable members and a head drivingly connected to one of said members and engageable with the work to apply a torsional force thereto with said first and said second members being movable relative to each other in response to the application of said torsional force to the work, the second member being elongated and subject to deflection under the influence of its own weight to cause slight relative movement between said members, the combination of:
   a gear mounted on the first member for pivotal movement relative thereto and drivingly connected to the second member whereby relative movement between said members imparts pivotal movement to said gear;
   means responsive to the pivotal movement of said gear to indicate the magnitude of the torsional force applied to the work, said slight relative movement between the members caused by the deflection of said second member under its own weight tending to pivot said gear and thereby introducing inaccuracy into the indicated magnitude of the torsional force; and
   means to counterbalance said gear to at least substantially retain said gear against pivotal movement in response to the tendency of said second member to deflect under the influence of its own weight.

2. A combination as defined in claim 1 wherein said gear is pivotally mounted by a rotatable pin secured to said gear and said last mentioned means includes a weighted member attached to said pin to supply the necessary counterbalancing force.

3. A combination as defined in claim 2 wherein said weighted member includes an elongated arm affixed to said pin and a weight movable along said arm whereby the amount of counterbalancing force can be adjusted.

4. A combination as defined in claim 1 wherein said last mentioned means includes a weight attached to said gear and positioned thereon to supply the desired counterbalancing force.

5. A combination as defined in claim 1 wherein the gear is shaped so as to inherently supply the requisite counterbalancing force.

6. A combination as defined in claim 1 wherein the counterbalancing means is adjustable.

7. In a torque wrench including first and second relatively movable members and a head drivingly connected to one of said members and engageable with the work to apply a force thereto with said first and said second members being movable relative to each other in response to the application of said force to the work, the second member being elongated and subject to deflection under the influence of its own weight to cause slight relative movement between said members, an indicator and means responsive to relative movement between said members to operate said indicator, said means responsive to relative movement including a pivotable member, said slight relative movement between said members caused by the deflection of said second member under its own weight tending to pivot said pivotable member and thereby introduce inaccuracy into the indicated magnitude of said force, the improvement comprising:
   means for counterbalancing said pivotable member to at least substantially retain said pivotable member against pivotable movement in response to the tendency of said second member to deflect under the influence of its own weight.

8. An improvement as defined in claim 7 wherein said means for counterbalancing includes a weight on said pivotable member.

9. A torque wrench comprising:
   first means for applying a force to the work, said means including a first member which is subject to deflection in response to the application of force to the work;
   second means for measuring the magnitude of said force, said second means including an actuating member of sufficient length to deflect relative to said first member under the influence of its own weight, means for mounting said actuating member to at least partially isolate said actuating member from said deflection of said first member whereby said first member deflects relative to said actuating member as a result of the application of force to the work, and an indicator responsive to relative movement between said members for providing an indication of the magnitude of said force; and
   third means for automatically substantially preventing the deflection of said actuating arm under the influence of its own weight from influencing the indication provided by said indicator independently of the position in which the torque wrench is zeroed.

10. A torque wrench as defined in claim 9 wherein said soecond means includes transmission means for transmitting the relative movement between said members to said indicator, said transmission means including a pivotable movement transmission member, and said third means includes means for at least substantially retaining said pivotable member against pivotable movement as a result of the deflection of the actuating member under the influence of its own weight.

11. A torque wrench as defined in claim 10 includes a weight on said pivotable member to counterbalance the pivotable member.

12. In a torque wrench for applying a torsional force to work, the combination of:
   an elongated generally tubular housing having handle means adjacent one end thereof, said housing having first and second opposite ends and being bendable at the first end about a transverse axis in response to the application of a bending force thereto whereby said housing defines a bendable generally tubular beam, said housing having first and second generally opposed wall portions adjacent said second end thereof;
   a head rigidly mounted on said housing adjacent the other end thereof and engageable with the work to apply the torsional force thereto in response to the application of said bending force to said housing, said head projecting through said first wall portion and extending toward said second wall portion;
   means for rigidly securing said head to both of said wall portions;
   an elongated actuating arm within said housing and at least substantially completely encased thereby, said actuating arm being partially received within a bore in said head and rigidly fixed to said head, said actuating arm etxending generally longitudinally toward said one end of said housing to terminate in a free end whereby bending of said housing causes relative movement between said housing and said free end of said actuating arm; and means on said housing responsive to said relative movement between said free end of said actuating arm and said housing to measure the magnitude of the twisting force, said means on said housing including a gear mounted for pivotal movement relative to said housing about a pivotal axis and mounted on said housing for movement therewith in response to said bending of said housing, said free end of said actuating arm and said gear being drivingly connected whereby the bending of said housing pivots said gear about said pivotal axis and means responsive to the pivoting of said gear about said pivotal axis for measuring the magnitude of said twisting force and wherein said actuating arm being bendable under the influence of its own weight and tending to impart slight movement to said free end thereof, said slight movement of said free end in at least some positions of said housing tending to impart slight pivotal movement to said gear, and means for counterbalancing said gear to prevent said slight movement of said actuating arm from imparting pivotal movement to said gear whereby the calibration of the torque wrench is not upset by turning of the housing into various positions.

References Cited

UNITED STATES PATENTS

| | | | |
|---|---|---|---|
| 2,159,354 | 5/1939 | Dunn | 73—139 |
| 2,159,373 | 5/1939 | Dunn | 73—139 |
| 2,367,224 | 1/1945 | Larson et al. | 73—139 |
| 2,722,834 | 11/1955 | Booth | 73—139 |

CHARLES A. RUEHL, Primary Examiner